(12) United States Patent
Burns et al.

(10) Patent No.: US 7,575,648 B1
(45) Date of Patent: Aug. 18, 2009

(54) SELECTIVE NON-CATALYTIC REDUCTION (SNCR) OF TOXIC GASEOUS EFFLUENTS

(75) Inventors: Sean P. Burns, Almont, MI (US); Larry A. Moquin, Rochester Hills, MI (US); Paresh S. Khandhadia, Troy, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 1331 days.

(21) Appl. No.: 09/638,606

(22) Filed: Aug. 15, 2000

Related U.S. Application Data

(63) Continuation-in-part of application No. 08/695,954, filed on Aug. 12, 1996, now abandoned.

(51) Int. Cl.
*D03D 23/00* (2006.01)
(52) U.S. Cl. .................................. 149/108.4
(58) Field of Classification Search .............. 101/108.4, 101/116; 149/45, 46, 61, 76; 280/741
See application file for complete search history.

(56) References Cited

U.S. PATENT DOCUMENTS

| | | | | |
|---|---|---|---|---|
| 3,715,131 A | * | 2/1973 | Hurley et al. ............... | 280/736 |
| 3,773,351 A | * | 11/1973 | Catanzarite ................. | 280/738 |
| 3,785,674 A | * | 1/1974 | Poole et al. ................. | 280/741 |
| 3,797,854 A | * | 3/1974 | Poole et al. ................. | 280/741 |
| 3,993,514 A | * | 11/1976 | Pacanowsky et al. ....... | 149/19.5 |
| 5,035,757 A | * | 7/1991 | Poole ........................... | 149/46 |
| 5,139,588 A | * | 8/1992 | Poole ........................... | 149/61 |
| 5,478,542 A | * | 12/1995 | Chawla et al. ............... | 423/235 |
| 5,545,272 A | * | 8/1996 | Poole et al. .................. | 149/48 |
| 5,682,014 A | * | 10/1997 | Highsmith et al. ........... | 149/36 |
| 5,847,315 A | * | 12/1998 | Katzakian et al. ............ | 149/36 |
| 5,853,683 A | * | 12/1998 | Gibbons et al. ............. | 423/235 |
| 6,065,774 A | * | 5/2000 | Cabrera ....................... | 149/36 |
| 6,074,502 A | * | 6/2000 | Burns et al. .................. | 149/36 |
| 6,143,104 A | * | 11/2000 | Blomquist .................... | 149/36 |
| 6,306,232 B1 | * | 10/2001 | Khandhadia et al. ......... | 149/22 |

FOREIGN PATENT DOCUMENTS

| | | | |
|---|---|---|---|
| DE | 3730141 | * | 3/1989 |
| WO | 98/06682 | * | 2/1998 |

* cited by examiner

*Primary Examiner*—Aileen B Felton
(74) *Attorney, Agent, or Firm*—L.C. Begin & Associates, PLLC.

(57) ABSTRACT

Selective non-catalytic reducing (SNCR) compounds, independent of the gas generant composition, reduce the toxicity of effluent gases produced by combustion of nonazide gas generating compositions used to inflate vehicle occupant restraint systems. It is believed that reaction of the $NH_2$ radical (formed from the SNCR compound) with NO in the combustion gas forms $N_2$ thereby decreasing the concentration of toxic nitrogen oxides therein. Heterogeneous placement of the reducing compound proximate to the gas generant bed within a gas generator ensures intimate contact with the combustion gases, and yet still provides a noninvasive method of toxic gas reduction.

20 Claims, No Drawings

SELECTIVE NON-CATALYTIC REDUCTION (SNCR) OF TOXIC GASEOUS EFFLUENTS

CROSS-REFERENCE TO RELATED APPLICATIONS

This application is a continuation-in-part of U.S. application Ser. No. 08/695,954 filed on Aug. 12, 1996 now abandoned.

BACKGROUND OF THE INVENTION

The present invention relates generally to gas generators, those used in inflatable occupant safety restraints in motor vehicles and aircraft for example, and more particularly to reducing the toxicity of effluent gases produced by nitrogen-containing gas generating compositions.

Inflatable occupant restraint devices for motor vehicles have been under development worldwide for many years, including the development of gas generating compositions for inflating such occupant restraints. Because the inflating gases produced by the gas generants must meet strict toxicity requirements, many gas generants now in use are based on alkali or alkaline earth metal azides, particularly sodium azide. When reacted with an oxidizing agent, sodium azide forms a relatively nontoxic gas consisting primarily of nitrogen.

However, azide-based gas generants are inherently volatile to handle and entail relatively high risk in manufacture and disposal. Stated another way, the inflating gases produced by azide-based gas generants are relatively nontoxic while the metal azides themselves are conversely highly toxic, thereby resulting in extra expense and risk in gas generant manufacture, storage, and disposal. In addition to direct contamination of the environment, metal azides also readily react with acids and heavy metals to form extremely sensitive compounds that may spontaneously ignite or detonate.

In contradistinction, nonazide gas generants, such as those disclosed in U.S. Pat. Nos. 5,035,757 and 5,139,588 to Poole (each herein incorporated by reference), typically comprise a nitrogen-containing nonazide fuel selected from the group of tetrazole compounds and/or metal salts thereof and an oxidizer. "Nonazide" gas generant compositions provide significant advantages over azide-based gas generants by reducing toxicity-related hazards during manufacture and disposal. Moreover, most nonazide gas generants typically supply a higher yield of gas (moles of gas per gram of gas generant) than conventional azide-based gas generants.

However, many nonazide gas generants heretofore known and used produce relatively high levels of toxic substances upon combustion as compared to azide-based gas generants. The most difficult toxic gases to control are the various oxides of nitrogen ($NO_x$) and carbon monoxide (CO). At present, nitrogen monoxide at 75 ppm or less and nitrogen dioxide at 10 ppm or less is generally acceptable. Because the gas generant of the passenger-side airbags is generally four times greater in quantity than that of the driver-side, the need for $NO_x$ and CO reduction is most keenly felt when designing passenger-side airbags. Nevertheless, the concern exists for other inflator systems within the vehicle as well.

Reduction of the level of toxic $NO_x$ and CO upon combustion of nonazide gas generants has proven to be a difficult problem. For instance, manipulation of the oxidizer/fuel ratio only reduces either the $NO_x$ or CO. More specifically, increasing the ratio of oxidizer to fuel minimizes the CO content upon combustion because the extra oxygen oxidizes the CO to carbon dioxide. Unfortunately, however, this approach results in increased amounts of $NO_x$. Alternatively, if the oxidizer/fuel ratio is lowered to eliminate excess oxygen and reduce the amount of $NO_x$ produced, increased amounts of CO are produced.

One way to improve the toxicity of the combustion gases is to reduce the combustion temperature that would reduce the initial concentrations of both CO and $NO_x$. Although simple in theory, it is difficult in practice to reduce the combustion temperature and to also retain a sufficiently high gas generant burn rate for practical application in an inflatable vehicle occupant restraint system. The burn rate of the gas generant is important to ensure that the inflator will operate readily and properly. As a general rule, the burn rate of the gas generant decreases as the combustion temperature decreases. By using less energetic fuels, specifically fuels that produce less heat upon combustion, the combustion temperature may be reduced but the gas generant burn rate is also reduced.

Finally, as restrictions on $NO_x$ emissions become more stringent, many gas generators, for example those currently used in occupant restraint systems, must be redesigned to reduce $NO_x$ emissions. This often requires redesign of contemporary inflators, gas generators, and gas generants. The costs can be substantial. Reducing the $NO_x$ without absorbing these costs would certainly be an improvement in the art.

Therefore, a need exists for reducing the toxicity of effluent gases produced by nonazide gas generants without substantially changing the combustion properties or reaction kinetics of the gas generant.

SUMMARY OF THE INVENTION

The aforesaid problems are solved by a gas generator that contains an ignition compound and a nontoxic, nonazide and pyrotechnic gas generating mixture. When employed with a selective non-catalytic reducing (SNCR) compound, the gas generant upon combustion produces inflating gases that have reduced levels of nitrogen oxides ($NO_x$) and carbon monoxide (CO).

In accordance with the present invention, SNCR compounds are selected from the group of ammonia derivatives such as ammonium salts, amines, amides, and imides. The SNCR compound is generally employed in an amount wherein each mol of NO resulting from combustion of the gas generant will correspond to at least one mol of nitrogen contained within an $NH_x$ (e.g. x=2, 3, or 4) group of an SNCR compound.

Stated another way, the SNCR compound is generally only provided in the gas generant bed if the gas generant tablets, extrusions, or other desired shapes contain elemental nitrogen and therefore produce relatively high levels of nitrogen oxides such as nitrogen monoxide and/or nitrogen dioxide upon combustion. One of ordinary skill will appreciate that many well-known nonazide gas generants exhibit these general requirements.

A "nonazide gas generant composition" is any nitrogen-containing gas generant composition having blended constituents or compounds that do not contain the functional group or characteristic formula known as azide. Azide is represented by $R(N_3)_x$ wherein R may be almost any metal atom, a hydrogen atom, a halogen atom, the ammonium radical, a complex, an organic radical like methyl, phenyl, nitrophenol, dinitrophenol, p-nitrobenzyl, ethyl nitrate, etc., and a variety of other groups or radicals. Preferred nonazide gas generants include those described in U.S. Pat. Nos. 5,035,757 and 5,139,588.

More specifically, the present invention comprises a nonazide gas generant composition, and a separate or discrete $NO_x$ reducing agent that theoretically liberates $NH_2$ radicals upon thermal decomposition and/or reaction with $O_2$. It is believed that the $NO_x$ gases generated from the combustion of the gas generant, such as NO and/or $NO_2$, selectively react with the $NH_2$ radical, or $NH_3$ and $O_2$, thereby producing a harmless gas of $N_2$. A corresponding reduction in CO is an incidental benefit with the use of some of the reducing agents, such as $(NH_4)_2SO_4$. In addition, the chemistry of the SNCR chemical is noninvasive. "Noninvasive", as understood in the art, is defined to mean that the addition of the SNCR chemical to the gas generant bed will not substantially interfere with the expected performance, reaction kinetics, or stability of the gas generant composition when it is combusted.

Thus, the present invention facilitates the use of known inflator systems that, when used without an SNCR agent, potentially exhibit $NO_x$ combustion levels in excess of present original equipment manufacturer (OEM) requirements. As a result, redesign, retooling, and remanufacturing of known inflators is not required notwithstanding excessive respective $NO_x$ combustion levels absent the SNCR system.

DETAILED DESCRIPTION OF THE PREFERRED EMBODIMENT(S)

In accordance with the present invention, a vehicle occupant restraint device utilizing an SNCR system comprises a gas generator, a gas generating composition and a de-$NO_x$ agent. In general, the gas generating composition can be described as a nitrogen-containing homogeneous mixture of a fuel and an oxidizer, and more preferably, a nonazide nitrogen-containing gas generating composition. Nonazide gas generating compositions are well known in the art. U.S. Pat. Nos. 5,035,757 and 5,139,588 exemplify but do not limit the gas generant compositions contemplated. In accordance with the present invention, nitrogen oxides (including nitrogen monoxide and/or nitrogen dioxide) must be produced upon combustion of the gas generating composition. As one of ordinary skill will appreciate, analysis of the combustion products, by theoretical calculations, by Fourier Transform Infrared Spectroscopy (FTIR), and/or by Chemiluminescence, for example, is a normal part of the design process thereby ensuring compliance with OEM air quality requirements. Therefore, one of ordinary skill in the art will readily appreciate those compositions producing $NO_x$.

The de-$NO_x$ agent (or SNCR agent), preferably provided at 0.01-4.0% (and more preferably at 0.1-3.0%) by weight of the total weight of the gas generant, is heterogeneously disposed around the periphery of the gas generant within the gas generant bed. The SNCR agent is selected from a group including ammonium compounds such as ammonium salts, amine-containing compounds having an —$NH_2$ group, or any compound which theoretically produces an $NH_2$ radical or an $NH_3$ molecule in the gas phase. Stated another way, the SNCR agent is sprinkled or distributed about the gas generant in heterogeneous relation thereto. Alternatively, the SNCR agent may be provided within one or more tea bags placed in contact with and proximate to the gas generant. The tea bags are supplied, for example, by Dexter Corporation in Windsor Locks, Conn. and are made from a special blend of thermoplastic fibers, manila hemp and other selected cellulose fibers.

Examples of ammonium salts include ammonium carbonate (($NH_4)_2CO_3$), ammonium sulfate (($NH_4)_2SO_4$), ammonium chloride ($NH_4Cl$), ammonium carbamate ($H_2NCO_2NH_4$), and ammonium fluoride ($NH_4F$). Urea ($H_2NCONH_2$) and cyanuric acid ($(HNCO)_3$) also exemplify SNCR agents in accordance with the present invention. Given the aforementioned benefits, the gas generant is preferably nonazide, although other nitrogen-containing gas generants such as an azide-based composition may be utilized in conjunction with SNCR. The SNCR chemical is preferably ammonium sulfate (($NH_4)_2SO_4$) based on the unexpected results given in Example 3 below. Not only does $(NH_4)_2SO_4$ inhibit production of toxic $NO_2$, it actually reduces $NO_2$ over time. Based on analysis of combustion gases, it is believed that ammonium salts will generate the highest yield of $NH_2$ radicals.

In general, preferred nonazide nitrogen-containing gas generant compositions (described in U.S. Pat. No. 5,139,588) contain at least one material of each of the following functional groups of materials: a) a fuel selected from the group of azole compounds consisting of triazole, aminotetrazole, tetrazole, bitetrazole, and metal salts of these compounds at 22 to about 36% by weight; b) an oxygen containing oxidizer compound selected from the group consisting of alkali metal, alkaline earth metal, lanthanide and ammonium nitrates and perchlorates or from the group consisting of alkali metal and alkaline earth metal chlorates and peroxides at 38 to about 62% by weight; and c) a low-temperature slag forming material which is sufficient in amount during combustion to cause the solid combustion particles to coalesce into easily filterable slag or clinkers but not so much as to make a low viscosity liquid, selected from the group consisting of silicon dioxide, boric oxide and vanadium pentoxide or from the group consisting of alkali metal silicates, borates, and carbonates or from the group consisting of naturally occurring clays and talcs, at 2 to 18% by weight of the total gas generant.

In theory, it is believed that selective non-catalytic reduction (SNCR) employs an $NH_2$ radical that selectively reacts with nitrogen oxide (NO) in the gas phase to form non-toxic nitrogen gas ($N_2$). In an SNCR system, it is believed that basic requirements for the reduction of NO by an SNCR chemical include a well-mixed minimal 1:1 ratio of $NH_2$ radical (or $NH_3$) to NO, whereby the $NH_2$ radical is generated by decomposition of the SNCR chemical and the NO is generated from the gas generant combustion. The reduced content of toxic gases, such as $NO_x$ and CO, permits the use of nonazide gas generants in vehicle occupant restraint systems while protecting the occupants of the vehicle from exposure to relatively higher levels of toxic gases.

SNCR technology is well known and commonly used in industrial boilers to decrease the levels of toxic nitrogen oxides. For example, see U.S. Pat. No. 4,119,702 to Azuhata et al., herein incorporated by reference. As described therein, nitrogen oxides can be readily reduced so long as the $NH_2$ radical is made available as shown in the reaction numbered (1).

Until now, SNCR technology has not been successfully implemented in automotive inflator systems. NO is reduced to $N_2$ by the following gas phase reactions:

$$NH_2 + NO \rightarrow N_2 + H_2O \quad (1)$$

$$NH_3 + NO + \tfrac{1}{4}O_2 \rightarrow N_2 + \tfrac{3}{2}H_2O \quad (2)$$

Because $NO_2$ is generated by NO, a reduction in NO necessarily causes an overall $NO_x$ reduction within the inflator gas. Thus, for every mol of NO produced by combustion of the gas generant composition, one mol of an $NH_2$ group (or radical) will be required to form $N_2$ and $H_2O$. Given equations 1 and 2, it will be apparent to one of ordinary skill that one —$NH_2$ radical corresponds to one mol of $NH_3$ or one $NH_4^+$ cation. Stated another way, one of ordinary skill will appreciate that for each mol of NO produced upon combustion of the gas generating composition, at least one mol of $NH_3$ in an oxygen-rich environment or one mol of —$NH_2$ must decompose from the SNCR compound. Thus, elementary chemistry dictates that one —$NH_2$ group or one mol of $NH_3$ will generally be liberated from a related group or ion in the SNCR compound. For example, $(NH_4)_2(SO_4)$ will theoretically liberate 2 mols of —$NH_2$ or 2 mols of $NH_3$, one mol for each $NH_4^+$ cation found in the compound.

To obtain $NH_2$ in the gas phase at an effective level, it is believed that the SNCR chemical thermally decomposes to generate $NH_2$ or $NH_3$ (which then subsequently reacts with $O_2$ to form $NH_2$). As shown in equation (1), the minimum $NH_2$/NO ratio in the gas phase reaction should be 1 mole of $NH_2$ for each mole of NO. SNCR technology is most effective at relatively higher initial levels of NO. When ammonia or ammonium salts are used, oxygen is necessary for the formation of $NH_2$, and should be present at levels of 0.1 to 11 volume percent.

The gas temperatures, degree of mixing, and residence time for a given inflator are determined primarily by the gas generant properties and the inflator configuration and operating conditions. One of ordinary skill will appreciate that the reaction kinetics related to reducing the amounts of $NO_x$ and CO can be enhanced or inhibited based on these design considerations. Nevertheless, the present invention is believed to be applicable to a wide variety of gas generators employing a wide variety of gas generant compositions. U.S. Pat. Nos. 5,628,528, 5,622,380, 5,700,973, 5,727,813, and 5,806,888 (each herein incorporated by reference) exemplify, but do not limit, various gas generator/inflator configurations that are deemed useful in the present context.

It will be appreciated that as the inflator configuration and coolant or filtering structure is varied, the effectiveness of the SNCR technology will also vary to greater or lesser effectiveness. Nevertheless, it is believed that the introduction of an SNCR agent to the gas generant bed of an airbag inflator will reduce the toxic gases regardless of the inflator structure given the general OEM operating requirements for airbag gas generators. Stated another way, the present invention is generically useful in a wide array of state of the art inflators given that all designs must comply with standard OEM requirements.

Thus, a preferred embodiment of the invention may also be expressed as an improvement within a gas generator comprising a pelletized and/or extruded nitrogen-containing nonazide gas generant composition having a fuel and an oxygen-containing oxidizer, wherein the gas generant composition combusts to yield gases comprising $NO_x$ gas, the improvement including:

a selective non-catalytic reducing compound selected from the group of ammonia derivatives consisting of ammonium salts, amines, amides, and imides, wherein the reducing compound contains at least one mole of elemental nitrogen per one mole of $NO_x$ produced by the gas generant mixture upon combustion, and is discretely interspersed about the gas generating composition in heterogeneous relation thereto.

Variables such as the thermodynamic properties of the generant, the burning rate of the generant, the cooling devices within the inflator, and the operating pressure of the inflator each contribute to the overall operating temperature of the SNCR system. The residence time of the gases in an inflator is dependent on the presence of choked flow and the operating pressure. One skilled in the art will readily realize that cognizance and tailoring of these variables when choosing a gas generant and an inflator will enable the use of a wide variety of gas generant compositions in conjunction with the SNCR system.

The present invention is illustrated by the following examples. In each example, the gas generant consisted of extruded or tableted compositions containing 28.6% 5-aminotetrazole (nitrogen-containing fuel), 57.4% strontium nitrate (nitrogen-containing oxidizer), 8% bentonite clay, and 6% potassium 5-aminotetrazole, formulated as taught in U.S. Pat. No. 5,139,588. U.S. Pat. No. 5,727,813 generally describes the inflator(s) used throughout the examples.

EXAMPLE 1

Two nonazide passenger inflators with the same gas generant and hardware were built. Ammonium carbonate $((NH_4)_2CO_3)$ was added directly to the generant bed of one of the inflators as a powder at 1.4 wt % of the generant mass. The inflators were deployed in a 100 ft³ tank and the gaseous effluents were measured over a 30 minute time period. Carbon monoxide (CO) and ammonia ($NH_3$) were measured by FTIR while nitrogen (II) oxide (NO), nitrogen (IV) oxide ($NO_2$), and total nitrogen oxides ($NO_x$) were measured by Chemiluminescence. The time-weighted averages are reported below in ppm.

| Inflator | CO | NO | $NO_2$ | $NO_x$ | $NH_3$ |
| --- | --- | --- | --- | --- | --- |
| Control | 665 | 85.7 | 29.6 | 117.6 | 14 |
| 1.4% $(NH_4)_2CO_3$ | 705 | 52.8 | 0.9 | 53.6 | 96 |
| Percent of Control | 106% | 62% | 3% | 46% | 686% |

This example illustrates that the addition of this SNCR ammonium salt significantly reduces the levels of toxic nitrogen oxides while leaving the CO essentially unchanged.

EXAMPLE 2

Two nonazide passenger airbag inflators with the same gas generant and hardware were built and tested as described in Example 1. However, the generant load and the cooling assembly differed from that used in Example 1. $((NH_4)_2CO_3)$ was added directly to the generant bed of one of the inflators as a powder at 2.6 wt % of the generant mass. The time-weighted averages are reported below in ppm.

| Inflator | CO | NO | $NO_2$ | $NO_x$ | $NH_3$ |
| --- | --- | --- | --- | --- | --- |
| Control | 822 | 106.1 | 50.5 | 162 | 16 |
| 2.6%$(NH_4)_2CO_3$ | 798 | 82.0 | 30.7 | 116 | 147 |
| Percent of Control | 97% | 77% | 61% | 72% | 919% |

This example demonstrates the effect of inflator design when optimizing SNCR technology in an airbag inflator.

EXAMPLE 3

Two nonazide passenger airbag inflators with the same gas generant and hardware were built and tested as described in Example 1. However, the generant load and the cooling assembly differed from that of Examples 1 and 2. $(NH_4)_2SO_4$ was added directly to the generant bed of one of the inflators as a powder at 1.2 wt % of the generant mass. The time-weighted averages are reported below in ppm.

| Inflator | CO | NO | $NO_2$ | $NO_x$ | $NH_3$ |
|---|---|---|---|---|---|
| Control | 437 | 59.6 | 12.5 | 73.3 | 8 |
| 1.2% $(NH_4)_2SO_4$ | 406 | 62.2 | 5.2 | 67.7 | 57 |
| Percent of Control | 93% | 104% | 42% | 92% | 712% |

Two unexpected yet beneficial results were observed from these tests. First, the addition of (($NH_4)_2SO_4$) resulted in a reduction of both $NO_x$ and CO. Secondly, a comparison of the $NO_2$ evolution in the control and in the SNCR samples indicates a decline over time of the $NO_2$ species in the SNCR sample and an increase in the $NO_2$ species in the control sample. For the control inflator, the $NO_2$ was 9.4 ppm at 3 minutes and 16.4 ppm at 30 minutes. This is normally expected since the NO initially produced by the inflator slowly converts to $NO_2$ in the presence of $O_2$. For the inflator with the SNCR chemical, the $NO_2$ was 7.8 ppm at 3 minutes and steadily decreased to 5.0 ppm at 30 minutes. This example illustrates the effectiveness of this embodiment in retarding the generation of toxic $NO_2$, despite the presence of increased amounts of relatively nontoxic NO and $O_2$.

EXAMPLE 4

Four nonazide passenger airbag inflators with the same gas generant and hardware were built and tested as described in Example 1. However, the generant load and the cooling assembly differed from that used in Examples 1, 2, or 3. $(NH_4)_2SO_4$ (decomposes at 235° C.) and $H_2NCO_2NH_4$ (sublimes at 60° C.) were each added directly to the generant bed of one of the inflators as a powder at 2.7 wt % of the generant mass. The time-weighted averages are reported below in ppm.

| Inflator | CO | NO | $NO_2$ | $NO_x$ | $NH_3$ |
|---|---|---|---|---|---|
| Control | 552 | 82.2 | 30.2 | 115.2 | 10 |
| 2.7% $(NH_4)_2SO_4$ | 453 | 81.5 | 6.2 | 66.2 | 105 |
| 2.7% $H_2NCO_2NH_4$ | 715 | 79 | 31 | 112.9 | 196 |

Again, the addition of $(NH_4)_2SO_4$ resulted in a reduction of $NO_x$ and CO. Also, the $NO_2$ level went from 9.4 ppm at 3 minutes to 5.6 ppm at 30 minutes, verifying the data shown in Example 3.

The above description thus implicitly discloses a method of reducing toxicity in effluent gases of a gas generator, produced by combustion of a nitrogen-containing gas generant composition used to inflate a vehicle occupant restraint system, and includes the step of:

inserting a selective non-catalytic reducing compound proximate to and in heterogeneous relationship to the gas generant composition and within the gas generator of a vehicle occupant restraint system, the selective non-catalytic reducing compound in an amount effective to reduce the concentration of particular toxic gases present in the effluent gases.

Stated another way, the method of reducing the nitrogen oxide and/or nitrogen dioxide contained in combustion gases of a gas generator used to inflate an airbag of a vehicle occupant restraint system, wherein the gas generator comprises, a nitrogen oxide-producing and/or nitrogen dioxide-producing gas generant composition adapted for use within said gas generator, contains the following steps:

(1) interspersing a selective non-catalytic reducing compound proximate to and in heterogeneous relationship with the gas generant composition;
(2) decomposing said selective non-catalytic reducing compound to form gaseous products;
(3) combusting said gas generant composition to form gaseous combustion products; and
(4) reacting the gaseous products of the selective non-catalytic reducing compound with the gaseous combustion products of the gas generant composition, thereby reducing the quantity of nitrogen monoxide and/or nitrogen dioxide contained in the gaseous combustion products of the gas generator.

It will be appreciated that steps 2-4 are inherent to the operation of any given inflator once the main gas generant is ignited.

While the preferred embodiment of the invention has been disclosed, it should be appreciated that the invention is susceptible of modification without departing from the scope of the following claims.

We claim:

1. A vehicle occupant restraint system comprising:
an inflatable air bag;
a gas generator for inflating said air bag;
a nitrogen-containing gas generant composition within said gas generator that forms nitrogen oxide and/or nitrogen dioxide upon combustion thereof; and
a selective non-catalytic reducing compound placed within said gas generator in heterogeneous relation to said gas generant composition, wherein said selective non-catalytic reducing compound is selected from the group consisting of ammonium salts and amine-containing compounds,
wherein at least one mol of the selective non-catalytic reducing compound is added per one mol of nitrogen oxide or nitrogen dioxide produced upon combustion of said gas generant composition.

2. A vehicle occupant restraint system comprising:
an inflatable air bag;
a gas generator for inflating said air bag;
a nitrogen-containing nonazide gas generant composition within said gas generator that forms nitrogen oxide and/or nitrogen dioxide upon combustion thereof; and
a selective non-catalytic reducing compound placed within said gas generator in heterogeneous relation to said gas generant composition, wherein said selective non-catalytic reducing compound is selected from the group consisting of ammonium salts and amine-containing compounds,
wherein at least one mol of the selective non-catalytic reducing compound is added per one mol of nitrogen oxide or nitrogen dioxide produced upon combustion of said gas generant composition.

3. A vehicle occupant restraint system comprising:
an inflatable air bag;
a gas generator for inflating said air bag;
a gas generant composition within said gas generator that forms nitrogen oxide and/or nitrogen dioxide upon combustion thereof; and
a selective non-catalytic reducing compound proximate to, separate from, and interspersed about the gas generant composition within said gas generator, wherein said selective non-catalytic reducing compound is selected from the group consisting of ammonium salts and amine-containing compounds, wherein at least one mol of the selective non-catalytic reducing compound is added per mol of nitrogen oxide or nitrogen dioxide produced upon combustion of said gas generant composition.

4. A vehicle occupant restraint system comprising:
an inflatable air bag;
a gas generator for inflating said air bag;
a gas generant composition within said gas generator that forms nitrogen oxide and/or nitrogen dioxide upon combustion thereof; and
a selective non-catalytic reducing compound placed proximate to, separate from, and interspersed about the gas generant composition within said gas generator, wherein said selective non-catalytic reducing compound is selected from the group consisting of ammonium salts, amides, imides, and amine-containing compounds,
wherein at least one mol of the selective non-catalytic reducing compound is added per mol of nitrogen oxide or nitrogen dioxide produced upon combustion of said gas generant composition.

5. A vehicle occupant restraint system comprising:
an inflatable air bag;
a gas generator for inflating said air bag;
a nonazide gas generant composition within said gas generator that forms nitrogen oxide and/or nitrogen dioxide upon combustion thereof; and
a selective non-catalytic reducing compound placed proximate to, separate from, and interspersed about the gas generant composition within said gas generator, wherein said selective non-catalytic reducing compound is selected from the group consisting of ammonium salts, amides, imides, and amine-containing compounds,
wherein at least one mol of the selective non-catalytic reducing compound is added per mol of nitrogen oxide and/or nitrogen dioxide produced upon combustion of said gas generant composition.

6. A vehicle occupant restraint system comprising:
an inflatable air bag;
a gas generator for inflating said air bag;
a nitrogen-containing gas generant composition located within said gas generator that forms nitrogen oxide and/or nitrogen dioxide upon combustion thereof; and
a selective non-catalytic reducing compound placed proximate to and interspersed about said gas generant composition, wherein said selective non-catalytic reducing compound is selected from the group consisting of ammonium salts,
wherein at least one mol of the selective non-catalytic reducing compound is added per mol of nitrogen oxide or nitrogen dioxide produced upon combustion of said gas generant composition.

7. A vehicle occupant restraint system comprising:
an inflatable air bag;
a gas generator for inflating said air bag;
a nitrogen-containing gas generant composition within said gas generator that forms nitrogen oxide and/or nitrogen dioxide upon combustion thereof; and
a selective non-catalytic reducing compound placed within said gas generator in heterogeneous relation to said gas generant composition, wherein said selective non-catalytic reducing compound is selected from the group consisting of ammonium salts, amides, imides, and amine-containing compounds,
wherein at least one mol of the selective non-catalytic reducing compound is added per one mol of nitrogen oxide or nitrogen dioxide produced upon combustion of said gas generant composition.

8. The vehicle occupant restraint system of claim 7 wherein said gas generant composition is extruded into a desirable shape and upon combustion yields gases comprising $NO_x$ gas, and, said reducing compound contains at least one mole of elemental nitrogen per one mole of $NO_x$ produced by the gas generant composition upon combustion and is discretely interspersed about the gas generant composition.

9. The vehicle occupant restraint system of claim 7 wherein said gas generant composition comprises at least one material of each of the following functional groups of materials—a) a fuel selected from the group of azole compounds consisting of triazole, aminotetrazole, tetrazole, bitetrazole, and metal salts of these compounds; b) an oxygen containing oxidizer compound selected from the group consisting of alkali metal, alkaline earth metal, lanthanide and ammonium nitrates and perchlorates or from the group consisting of alkali metal and alkaline earth metal chlorates and peroxides; and c) a low-temperature slag forming material which is sufficient in amount during combustion to cause the solid combustion particles to coalesce into easily filterable slag or clinkers but not so much as to make a low viscosity liquid, selected from the group consisting of silicon dioxide, boric oxide and vanadium pentoxide or from the group consisting of alkali metal silicates, borates, and carbonates or from the group consisting of naturally occurring clays and talcs, and, the gas generant composition is extruded into a desirable shape and combusts to yield gases comprising $NO_x$ gases, and, the reducing compound contains at least one mole of elemental nitrogen per one mole of $NO_x$ produced by the gas generating mixture upon combustion, and is interspersed about the gas generant composition.

10. The vehicle occupant restraint system of claim 7 wherein said nitrogen-containing gas generant composition produces nitrogen oxide and/or nitrogen dioxide upon combustion thereof and said selective non-catalytic reducing compound is proximate to and heterogeneously interspersed about said gas generant composition, whereby said reducing compound reduces the nitrogen monoxide and/or nitrogen dioxide produced from combustion of said gas generant composition.

11. The vehicle occupant restraint system of claim 8 wherein said nitrogen-containing gas generant composition produces nitrogen oxide and/or nitrogen dioxide upon combustion thereof and said selective non-catalytic reducing compound is proximate to and heterogeneously interspersed about said gas generant composition, whereby said reducing compound reduces the nitrogen monoxide and/or nitrogen dioxide produced from combustion of said gas generant composition.

12. The vehicle occupant restraint system of claim 9 wherein said nitrogen-containing gas generant composition produces nitrogen oxide and/or nitrogen dioxide upon combustion thereof and said selective non-catalytic reducing compound is proximate to and heterogeneously interspersed about said gas generant composition, whereby said reducing compound reduces the nitrogen monoxide and/or nitrogen dioxide produced from combustion of said gas generant composition.

13. A vehicle occupant restraint system of claim 7 wherein:
said selective non-catalytic reducing compound is selected from the group consisting of ammonium carbonate (($NH_4$)$_2CO_3$), ammonium sulfate (($NH_4$)$_2SO_4$), ammonium chloride ($NH_4Cl$), ammonium carbamate ($H_2NCO_2NH_4$), and ammonium fluoride ($NH_4F$).

14. The vehicle occupant restraint system of claim 1 wherein said selective non-catalytic reducing compound is ammonium sulfate.

15. The vehicle occupant restraint system of claim 2 wherein said selective non-catalytic reducing compound is ammonium sulfate.

16. The vehicle occupant restraint system of claim 3 wherein the gas generant composition is a nonazide gas generant composition and the selective non-catalytic reducing compound is ammonium sulfate.

17. The vehicle occupant restraint system of claim 4 wherein the gas generant composition is a nonazide gas generant composition and the selective non-catalytic reducing compound is ammonium sulfate.

18. The vehicle occupant restraint system of claim 5 wherein said selective non-catalytic reducing compound is ammonium sulfate.

19. The vehicle occupant restraint system of claim 6 wherein said gas generant composition is a nonazide composition and said selective non-catalytic reducing compound is ammonium sulfate.

20. The vehicle occupant restraint system of claim 6 wherein:

said selective non-catalytic reducing compound is selected from the group consisting of ammonium carbonate $((NH_4)_2CO_3)$, ammonium sulfate $((NH_4)_2SO_4)$, ammonium chloride $(NH_4Cl)$, ammonium carbamate $(H_2NCO_2NH_4)$, and ammonium fluoride $(NH_4F)$.

* * * * *